Figure 1:
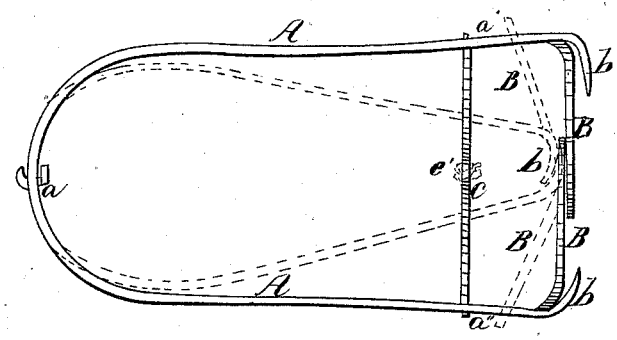

J. Teed,
Burrow Trap.

Nº 63,961. Patented Apr. 16, 1867.

Witnesses:
Illins Herringsheva
John D. Bloor

Inventor:
Jesse Teed
by his attorney
S. S. Fahnestock

United States Patent Office.

JESSE TEED, OF TOMPKINS, NEW YORK.

Letters Patent No. 63.961, dated April 16, 1867.

IMPROVEMENT IN ANIMAL TRAPS.

*The Schedule referred to in these Letters Patent and making part of the same.*

TO ALL WHOM IT MAY CONCERN:

Be it known that I, JESSE TEED, of the town of Tompkins, and county of Delaware, in the State of New York, have invented a new and "Improved Animal Trap;" and I do hereby declare that the following is a full and exact description thereof, reference being had to the accompanying drawings, and to the letters of reference marked thereon, like letters indicating like parts in the several figures.

The nature of my invention consists in forming my trap of one piece of tempered steel, besides its trigger, thus gaining by simplicity as well as economy without impairing efficiency. In the drawings—

Figure 1 represents a top view of my trap.

Figure 2:
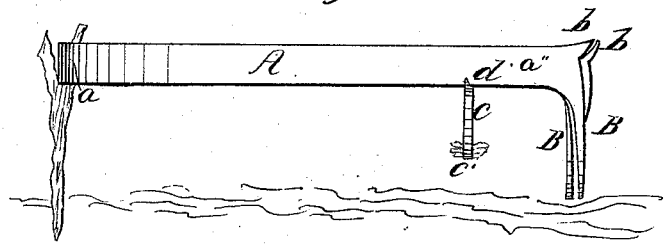

Figure 2, a side view; and

Figure 3:
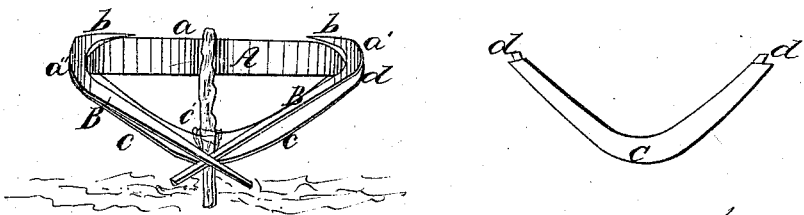

Figure 3, an end view of the front.

A represents the main part of the trap, curved at the rear end, $a$, and divided at its front end, as will be presently described. It can be made out of a piece of sheet or bar steel sheared off for the purpose, and properly tempered after being bent and the front legs and teeth formed. B represents the front supporting legs, and $b$ the teeth or penetrating jaws to hold the animal. C is a trigger as well as brace, of curved form, to hold the two sides $a'$ and $a''$ apart. To it the bait is attached at $c'$. The upper ends of C have small notches, $d$, in them, to assist in holding the two sides apart; but when the bait is pulled upon, the bottom of C is pulled upwards, and as a brace it is pulled out from between the sides. This, acting as a trigger when pulled upon, the extreme front ends of $a$ and $a'$ come together by virtue of the spring formation of the trap, and the teeth $b$ penetrate the head or body of the animal, which must approach the bait in that way. To effect this, the trap may be placed in a box having an opening in front, or it can be so protected in any suitable manner by stones, brush, &c., so as to oblige the animal to seek the bait by entering between the teeth. The rear or curved end of A may be supported on a forked stick, to keep the frame level; it can also be anchored or secured there, and the brace or trigger C, as well as the front legs, should rest on some smooth surface, so as to promote their operation; that is, so that the brace or trigger can easily be "pulled out" from between the jaws, permitting them to come together.

Having thus described my invention, what I claim as new, and desire to secure by Letters Patent of the United States, is—

The combination of the spring trap A, (composed of one piece,) and having two supporting legs B B, and the detachable brace or trigger C, arranged and operating in the manner shown and described, and for the purpose set forth.

In testimony whereof I have hereunto subscribed my name.

JESSE TEED.

Witnesses:
JOHN S. HOLLINGSHEAD,
JOHN D. BLOOR.